United States Patent
Park et al.

(10) Patent No.: US 11,322,785 B2
(45) Date of Patent: May 3, 2022

(54) SECONDARY BATTERY

(71) Applicants: HYUNDAI MOTOR COMPANY, Seoul (KR); KIA MOTORS CORPORATION, Seoul (KR)

(72) Inventors: Sang Mok Park, Gwangju-si (KR); Young Woo Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 109 days.

(21) Appl. No.: 16/896,452

(22) Filed: Jun. 9, 2020

(65) Prior Publication Data

US 2021/0184292 A1 Jun. 17, 2021

(30) Foreign Application Priority Data

Dec. 12, 2019 (KR) .......................... 10-2019-0165931

(51) Int. Cl.
*H01M 10/6554* (2014.01)
*H01M 10/613* (2014.01)
*H01M 10/647* (2014.01)
*H01M 10/0585* (2010.01)
*H01M 50/183* (2021.01)
(Continued)

(52) U.S. Cl.
CPC ... *H01M 10/6554* (2015.04); *H01M 10/0585* (2013.01); *H01M 10/613* (2015.04); *H01M 10/647* (2015.04); *H01M 50/148* (2021.01); *H01M 50/183* (2021.01); *H01M 50/20* (2021.01)

(58) Field of Classification Search
CPC ......... H01M 10/6554; H01M 10/6555; H01M 10/647; H01M 10/613; H01M 10/0585; H01M 50/183; H01M 50/20; H01M 50/148
See application file for complete search history.

(56) References Cited

U.S. PATENT DOCUMENTS 8,426,057 B2 4/2013 Park et al.
2011/0256436 A1* 10/2011 Eo ....................... H01M 10/647
429/94

(Continued)

FOREIGN PATENT DOCUMENTS

KR 10-1264527 B1 5/2013
KR 10-2014-0090336 A 7/2014
(Continued)

*Primary Examiner* — James Lee
(74) *Attorney, Agent, or Firm* — Morgan, Lewis & Bockius LLP (57) ABSTRACT

A secondary battery includes a first electrode assembly including a first cathode and a first anode, a second electrode assembly that is disposed to be opposite the first electrode assembly and that includes a second cathode and a second anode, a cooling plate disposed between the first and second electrode assemblies for cooling of the first and second electrode assemblies, an exterior material in which the first and second electrode assemblies are disposed, a cathode tab electrically connected to the first and second cathodes and exposed outside the exterior material, and an anode tab electrically connected to the first and second anodes and exposed outside the exterior material, in which at least one of the cathode tab and the anode tab is coupled to the cooling plate.

11 Claims, 8 Drawing Sheets

(51) Int. Cl.
*H01M 50/20* (2021.01)
*H01M 50/148* (2021.01)

(56) References Cited

U.S. PATENT DOCUMENTS

| | | |
|---|---|---|
| 2011/0274955 A1 | 11/2011 | Park et al. |
| 2013/0216880 A1 | 8/2013 | Park et al. |
| 2013/0323563 A1* | 12/2013 | Eo .................... H01M 10/6554 429/120 |

FOREIGN PATENT DOCUMENTS

| KR | 10-1446149 B1 | 10/2014 |
| KR | 10-1589984 B1 | 1/2016 |
| KR | 10-2017-0020996 A | 2/2017 |
| KR | 10-1826861 B1 | 2/2018 |
| KR | 10-1908452 B1 | 10/2018 |

\* cited by examiner

SECONDARY BATTERY

CROSS-REFERENCE TO RELATED APPLICATION

The present application claims the benefit of priority to Korean Patent Application No. 10-2019-0165931, filed on Dec. 12, 2019 with the Korean Intellectual Property Office, the entire disclosure of which is incorporated herein by reference.

TECHNICAL FIELD

The present disclosure relates to a secondary battery.

BACKGROUND

A secondary battery includes an electrode assembly including a cathode and an anode, an exterior material for receiving the electrode assembly, and a cathode tab and an anode tab for electrically connecting the cathode and the anode to the outside of the exterior material. The tabs are easily deformed when loads are applied thereto. Furthermore, the loads applied to the tabs may be transmitted to the electrode assembly to deform the electrode assembly. These problems noticeably arise in a pouch type secondary battery. In addition, a seal has to be formed between the exterior material and the tabs, and due to this, a selection of the exterior material or a sealing method for the exterior material may be limited. Further, the secondary battery may be difficult to normally operate at high temperature. To prevent this problem, a structure for cooling the secondary battery may be additionally required for a device having the secondary battery installed therein. However, the structure may cause the corresponding device to be complex.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a secondary battery for preventing deformation of tabs or deformation of electrode assemblies even though loads are applied to the tabs.

Another aspect of the present disclosure provides a secondary battery for enabling a free selection of an exterior material or a sealing method thereof by excluding a seal between the exterior material and tabs.

Another aspect of the present disclosure provides a secondary battery having its own structure capable of cooling the secondary battery.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a secondary battery includes a first electrode assembly including a first cathode and a first anode, a second electrode assembly that is disposed to be opposite the first electrode assembly and that includes a second cathode and a second anode, a cooling plate disposed between the first and second electrode assemblies for cooling of the first and second electrode assemblies, an exterior material in which the first and second electrode assemblies are disposed, a cathode tab electrically connected to the first and second cathodes and exposed outside the exterior material, and an anode tab electrically connected to the first and second anodes and exposed outside the exterior material, in which at least one of the cathode tab and the anode tab is coupled to the cooling plate.

In an embodiment, the cooling plate may include a first cooling plate in contact with a surface of the first electrode assembly that faces the second electrode assembly, and a second cooling plate that is disposed to be opposite the first cooling plate and in contact with a surface of the second electrode assembly that faces the first electrode assembly.

In an embodiment, the cooling plate may further include an adhesive layer that is arranged between the first and second cooling plates and that bonds the first and second cooling plates to each other.

In an embodiment, the cathode tab and the anode tab may be arranged between the first and second cooling plates.

In an embodiment, the secondary battery may include a first insulating material that surrounds an area of the cathode tab to insulate the cathode tab from the first and second cooling plates, in which the area of the cathode tab overlaps the first and second cooling plates in a stacking direction of the first and second electrode assemblies, and a second insulating material that surrounds an area of the anode tab to insulate the anode tab from the first and second cooling plates, in which the area of the anode tab overlaps the first and second cooling plates in the stacking direction.

In an embodiment, the first and second insulating materials may extend outside the first and second cooling plates to be exposed.

In an embodiment, the cooling plate may further include a first cathode hole that is formed through a first area of the first cooling plate and that exposes the cathode tab outside the first cooling plate, in which the first area of the first cooling plate overlaps the cathode tab in the stacking direction, a first anode hole that is formed through a second area of the first cooling plate and that exposes the anode tab outside the first cooling plate, in which the second area of the first cooling plate overlaps the anode tab in the stacking direction, a second cathode hole that is formed through a first area of the second cooling plate and that exposes the cathode tab outside the second cooling plate, in which the first area of the second cooling plate overlaps the cathode tab in the stacking direction, and a second anode hole that is formed through a second area of the second cooling plate and that exposes the anode tab outside the second cooling plate, in which the second area of the second cooling plate overlaps the anode tab in the stacking direction.

In an embodiment, the first electrode assembly may further include a first cathode lead extending from the first cathode and connected to the cathode tab through the first cathode hole, and a first anode lead extending from the first anode and connected to the anode tab through the first anode hole, and the second electrode assembly may further include a second cathode lead extending from the second cathode and connected to the cathode tab through the second cathode hole, and a second anode lead extending from the second anode and connected to the anode tab through the second anode hole.

In an embodiment, the secondary battery may further include third insulating materials disposed along inside surfaces of the first cooling plate that define the first cathode hole and the first anode hole, and fourth insulating materials disposed along inside surfaces of the second cooling plate that define the second cathode hole and the second anode hole.

In an embodiment, the exterior material may include an upper exterior material and a lower exterior material, wherein a receiving space, in which the first and second electrode assemblies are disposed, is defined between the upper and lower exterior materials, and the cooling plate may be formed such that a periphery of the cooling plate is exposed outside the upper and lower exterior materials.

In an embodiment, the secondary battery may further include an upper sealing layer that hermetically joins the upper exterior material to an upper surface of the cooling plate and a lower sealing layer that hermetically joins the lower exterior material to a lower surface of the cooling plate.

In an embodiment, the cooling plate may include a first cooling plate disposed on a side of the first electrode assembly that faces the second electrode assembly, a second cooling plate disposed on a side of the second electrode assembly so as to be opposite the first cooling plate, in which the side of the second electrode assembly faces the first electrode assembly, an adhesive layer that is arranged between the first and second cooling plates and that bonds the first and second cooling plates, and a sensor insertion opening that is formed in the adhesive layer to allow for insertion of a temperature sensor and that extends from one portion of the adhesive layer exposed outside the upper and lower exterior materials to another portion of the adhesive layer where the first and second electrode assemblies are located.

In an embodiment, the cooling plate and the exterior material may have through-holes formed through the cooling plate and the exterior material in corresponding positions.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings.

Further, in describing the embodiment of the present disclosure, a detailed description of well-known features or functions will be ruled out in order not to unnecessarily obscure the gist of the present disclosure.

Figure 1:
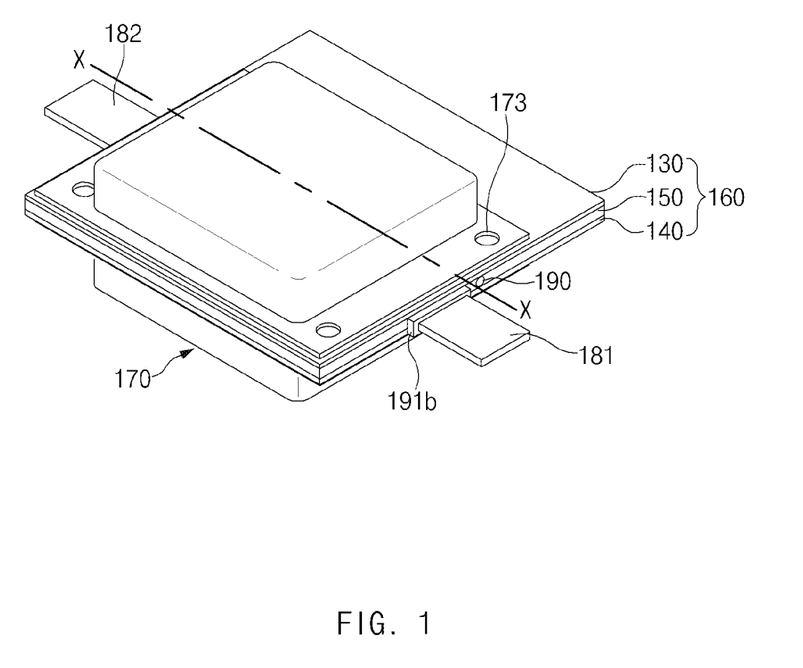
FIG. 1 is a perspective view illustrating a secondary battery according to an exemplary embodiment of the present disclosure.
Figure 2:
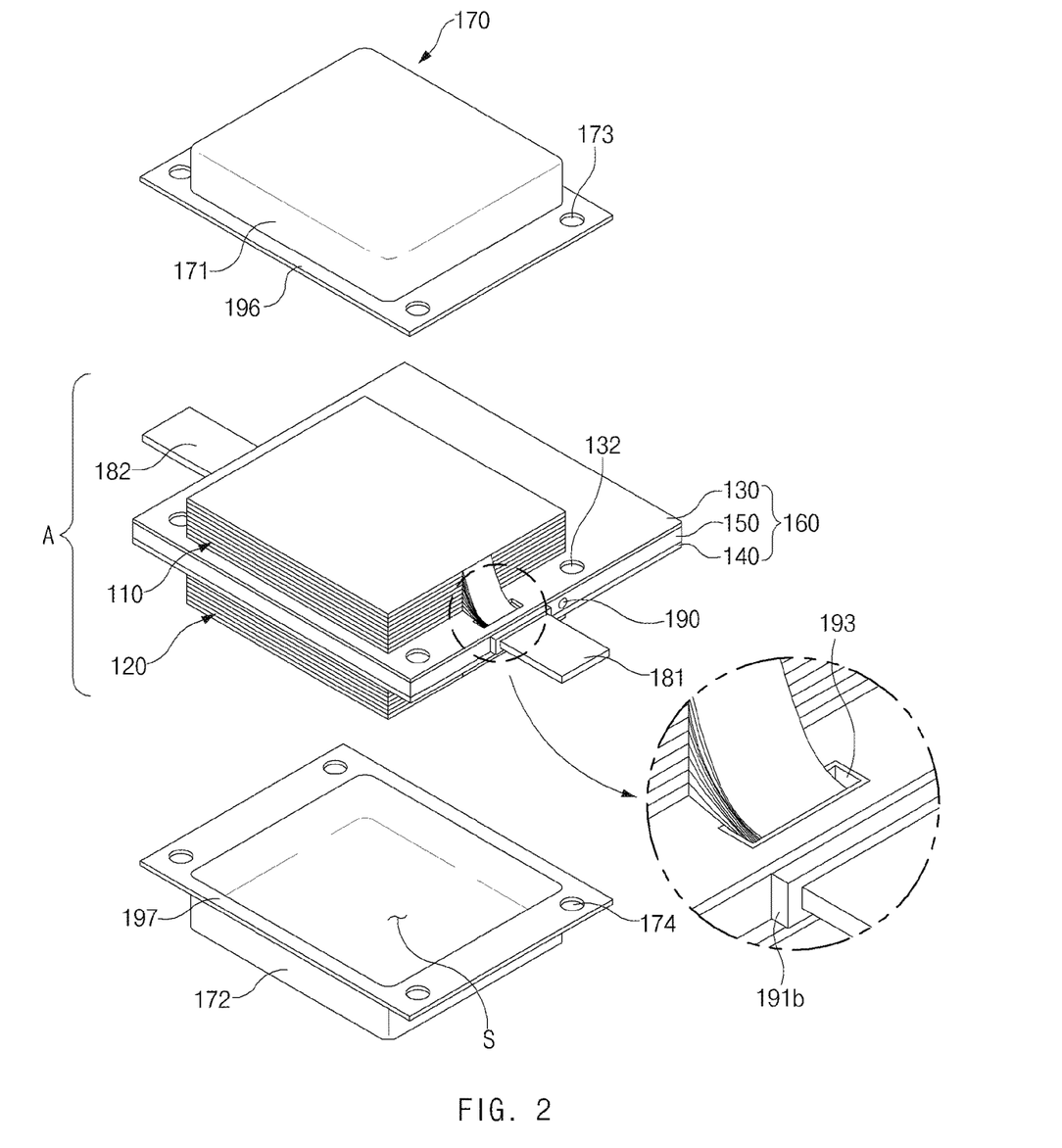
FIG. 2 is an exploded perspective view of the secondary battery of FIG. 1.
Figure 3:
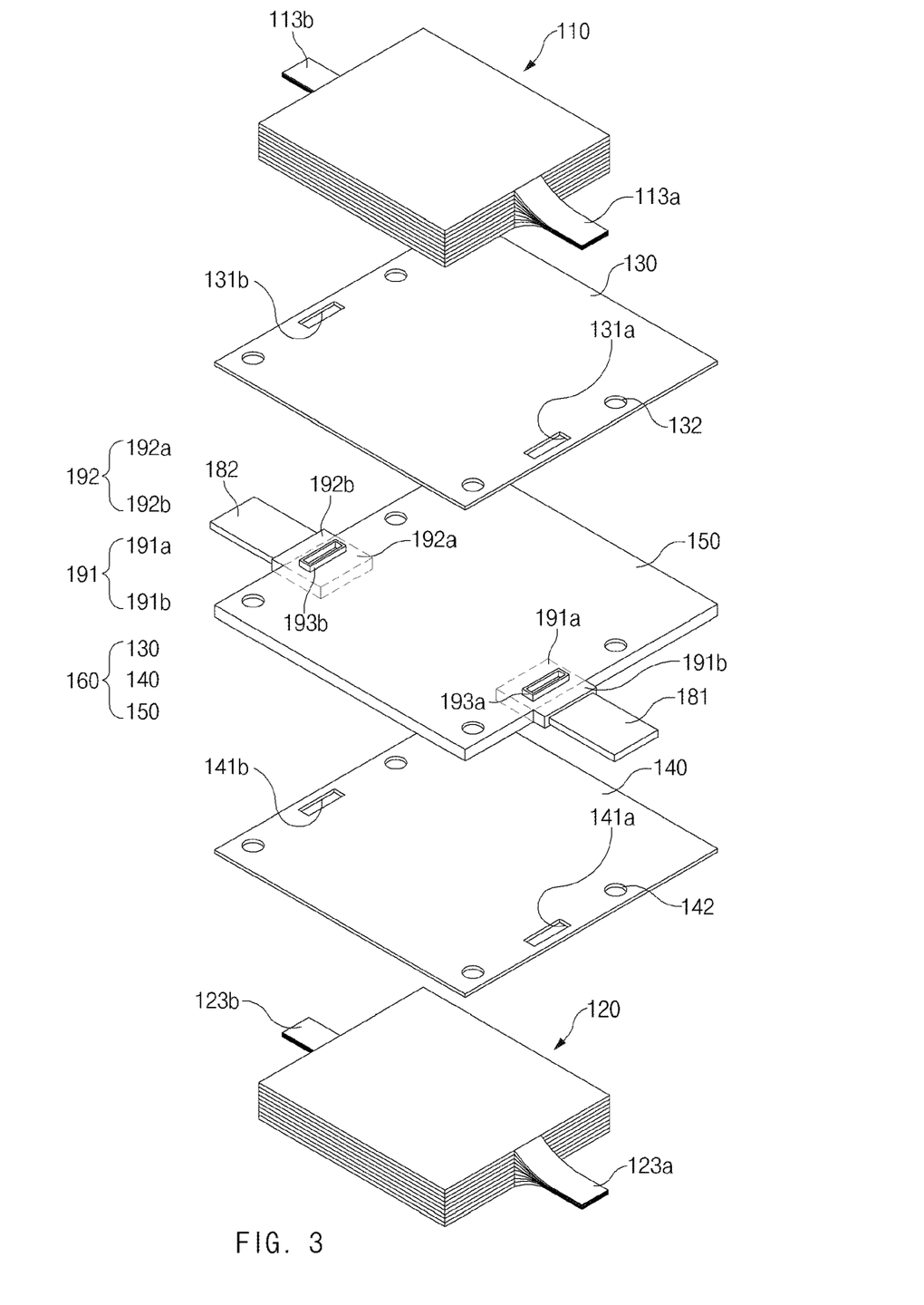
FIG. 3 is an exploded perspective view of portion A of the secondary battery of FIG. 2.
Figure 4:
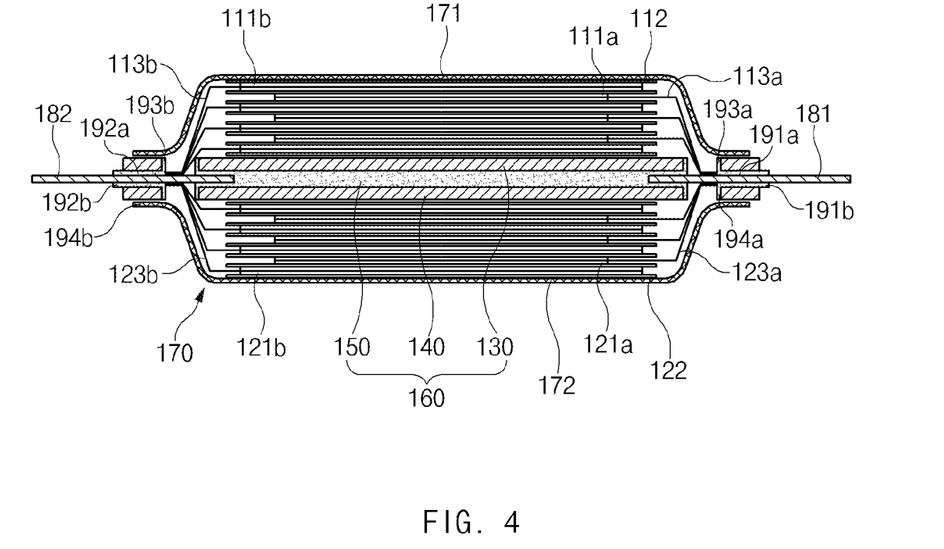
FIG. 4 is a sectional view of the secondary battery taken along line X-X of FIG. 1.
Figure 5:
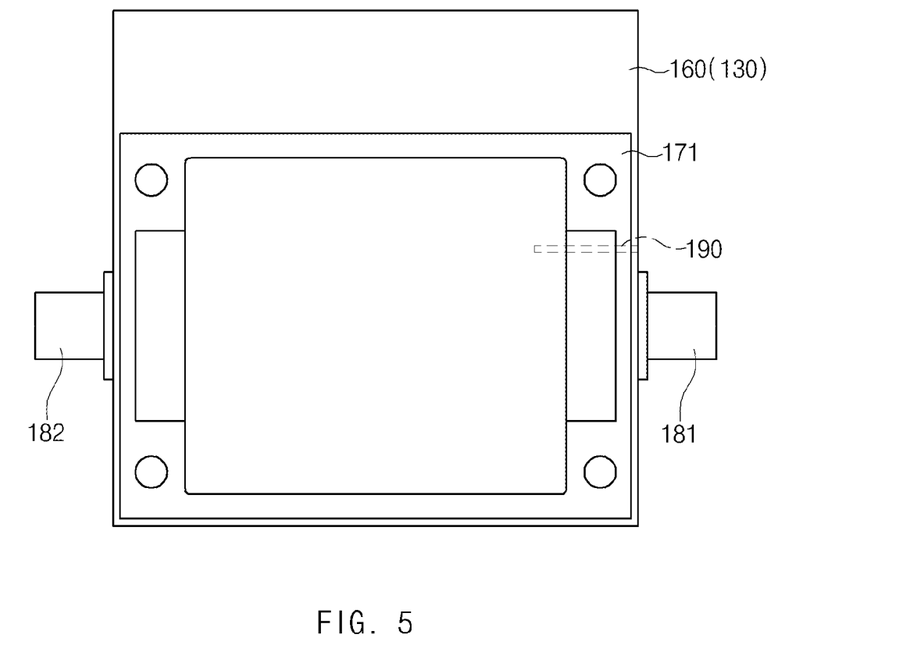
FIG. 5 is a plan view of the secondary battery of FIG. 1.

FIG. 1 is a perspective view illustrating a secondary battery according to an exemplary embodiment of the present disclosure. FIG. 2 is an exploded perspective view of the secondary battery of FIG. 1. FIG. 3 is an exploded perspective view of portion A of the secondary battery of FIG. 2. FIG. 4 is a sectional view of the secondary battery taken along line X-X of FIG. 1. FIG. 5 is a plan view of the secondary battery of FIG. 1. As illustrated in FIGS. 1 to 5, the secondary battery according to an exemplary embodiment of the present disclosure includes a first electrode assembly 110, a second electrode assembly 120, a cooling plate 160, an exterior material 170, a cathode tab 181, and an anode tab 182.

As illustrated in FIG. 4, the first electrode assembly 110 includes a first cathode 111*a* and a first anode 111*b*. The first cathode 111*a* and the first anode 111*b* may be a general cathode and a general anode that are applied to a lithium-ion secondary battery. This is the same even in the case of a second cathode 121*a* and a second anode 121*b* that will be described below.

For example, the first cathode 111*a* may be manufactured by applying a cathode active material to opposite surfaces of a cathode current collector, and the first anode 111*b* may be manufactured by applying an anode active material to opposite surfaces of an anode current collector. A first cathode lead 113*a* that will be described below may be a portion of the cathode current collector to which the cathode active material is not applied, and a first anode lead 113*b* that will be described below may be a portion of the anode current collector to which the anode active material is not applied. The first electrode assembly 110 may be a general jelly-roll type electrode assembly or a general stack type electrode assembly. The first electrode assembly 110 further includes a separator 112.

As illustrated in FIG. 4, the second electrode assembly 120 includes the second cathode 121*a* and the second anode 121*b*. The second electrode assembly 120 may be a general jelly-roll type electrode assembly or a general stack type electrode assembly. The second electrode assembly 120 further includes a separator 122. As illustrated in FIG. 2, the second electrode assembly 120 may be disposed to opposite the first electrode assembly 110. For example, the second electrode assembly 120 may be disposed such that an upper surface of the second electrode assembly 120 faces a lower surface of the first electrode assembly 110 with respect to FIG. 2.

As illustrated in FIGS. 2 and 3, the cooling plate 160 for cooling the first and second electrode assemblies 110 and 120 is disposed between the first and second electrode assemblies 110 and 120. The cooling plate 160 may receive heat generated from the first and second electrode assemblies 110 and 120 and may release the heat to the outside of the secondary battery, thereby dissipating the heat from the first and second electrode assemblies 110 and 120. The secondary battery of this embodiment includes the cooling plate 160. Accordingly, a separate cooling structure may not be used, or the use of the separate cooling structure may be reduced. The cooling plate 160 may be used not only to cool the electrode assemblies 110 and 120 but also to heat the electrode assemblies 110 and 120.

The exterior material 170 receives the first and second electrode assemblies 110 and 120. To this end, the exterior material 170 may have a receiving space S therein (refer to FIG. 2). The exterior material 170 may be a general aluminum pouch.

The cathode tab 181 is electrically connected to the first and second cathodes 111a and 121a. For example, as illustrated in FIG. 4, the cathode tab 181 may be electrically connected to the first and second cathodes 111a and 121a through the first and second cathode leads 113a and 123a by being connected to the first and second cathode leads 113a and 123a that are connected to the first and second cathodes 111a and 121a, respectively. The cathode tab 181 extends in a first direction of the secondary battery and is exposed outside the exterior material 170 in the first direction.

The anode tab 182 is electrically connected to the first and second anodes 111b and 121b. For example, the anode tab 182 may be electrically connected to the first and second anodes 111b and 121b through the first and second anode leads 113b and 123b by being connected to the first and second anode leads 113b and 123b that are connected to the first and second anodes 111b and 121b, respectively. The anode tab 182 extends in the first direction and is exposed outside the exterior material 170 in the first direction. The cathode tab 181 and the anode tab 182 may be arranged on opposing sides of the secondary battery in the first direction.

At least one of the cathode tab 181 and the anode tab 182 is coupled to the cooling plate 160. For example, the cathode tab 181 and the anode tab 182 may be coupled to the cooling plate 160 by being inserted between first and second cooling plates 130 and 140. The coupling may be performed through an adhesive layer 150 that will be described below. In FIG. 2, it is exemplified that both the cathode tab 181 and the anode tab 182 are coupled to the cooling plate 160.

In the related art, tabs are easily deformed when loads are applied thereto. Furthermore, the loads applied to the tabs may be transmitted to electrode assemblies to deform the electrode assemblies. These problems noticeably arise in a pouch type secondary battery. To overcome these problems, the tabs 181 and 182 are coupled to the cooling plate 160 in the secondary battery of this embodiment. In the secondary battery of this embodiment, the tabs 181 and 182 are fixed to the cooling plate 160 by being coupled to the cooling plate 160. Accordingly, even though loads are applied to the tabs 181 and 182 in a manufacturing process, deformation of the tabs 181 and 182 may be minimized. Furthermore, due to the cooling plate 160, the loads applied to the tabs 181 and 182 are not directly transmitted to the electrode assemblies 110 and 120, and thus deformation of the electrode assemblies 110 and 120 may be minimized even though the loads are applied to the tabs 181 and 182 in the manufacturing process.

The cooling plate 160 is formed to have a larger area than the tabs 181 and 182. Further, the cooling plate 160 may be formed of a material having a higher stiffness than the tabs 181 and 182. Due to this, the cooling plate 160 may have a higher stiffness than the tabs 181 and 182 and may thus more effectively prevent deformation.

As illustrated in FIG. 3, the cooling plate 160 may include the first cooling plate 130 and the second cooling plate 140 disposed to be opposite the first cooling plate 130. The first and second cooling plates 130 and 140 may be flat plates made of aluminum, copper, nickel, stainless steel, or the like. The first and second cooling plates 130 and 140 may be formed to have a thickness of 0.3 mm to 3.0 mm.

The first cooling plate 130 may be disposed to make contact with the surface of the first electrode assembly 110 that faces the second electrode assembly 120, and the second cooling plate 140 may be disposed to make contact with the surface of the second electrode assembly 120 that faces the first electrode assembly 110. For example, with respect to FIG. 3, the first cooling plate 130 may be disposed to make contact with the lower surface of the first electrode assembly 110, and the second cooling plate 140 may be disposed to make contact with the upper surface of the second electrode assembly 120. When the cooling plate 160 makes direct contact with the electrode assemblies 110 and 120, heat transfer efficiency may be improved. Due to this, the electrode assemblies 110 and 120 may be rapidly cooled or heated.

As illustrated in FIGS. 2 and 3, the cooling plate 160 may further include the adhesive layer 150 that is arranged between the first and second cooling plates 130 and 140 and that bonds the first and second cooling plates 130 and 140. The adhesive layer 150 may be formed of polypropylene (PP), polyethylene (PE), polyethylene terephthalate (PET), or the like. The adhesive layer 150 may be formed to have a thickness of 0.5 mm to 3.5 mm. When the first and second cooling plates 130 and 140 are bonded by the adhesive layer 150, the tabs 181 and 182 arranged between the first and second cooling plates 130 and 140 may be more stably fixed. For example, the adhesive layer 150 may relieve pressure that is applied to the secondary battery from top to bottom or from bottom to top with respect to FIG. 2. The adhesive layer 150 may form a seal between the first and second cooling plates 130 and 140.

As illustrated in FIG. 3, the secondary battery of this embodiment may further include a first insulating material 191 for insulating the cathode tab 181 from the first and second cooling plats 130 and 140 and a second insulating material 192 for insulating the anode tab 182 from the first and second cooling plates 130 and 140. The first insulating material 191 may surround the area of the cathode tab 181 that overlaps the first and second cooling plates 130 and 140. The second insulating material 192 may surround the area of the anode tab 182 that overlaps the first and second cooling plates 130 and 140. The first and second insulating materials 191 and 192 may be formed of polypropylene (PP). The first and second insulating materials 191 and 192 may be provided separately from the adhesive layer 150, but as illustrated in FIG. 3, may be integrated with the adhesive layer 150.

The first and second insulating materials 191 and 192 may bond the tabs 181 and 182 and the cooling plates 130 and 140 and may form a seal between the cooling plates 130 and 140, as well as insulating the tabs 181 and 182. Because the tabs 181 and 182 are sealed by the first and second insulating materials 191 and 192 between the cooling plats 130 and 140, a separate process of forming a seal between the tabs 181 and 182 and the exterior material 170 may be omitted. Accordingly, in the case of manufacturing the secondary battery of this embodiment, a seal between the tabs 181 and 182 and the exterior material 170 does not need to be considered, and thus the exterior material 170 or a sealing method for the exterior material 170 may be more freely selected.

As illustrated in FIG. 4, the first and second insulating materials 191 and 192 may extend so as to be exposed outside the first and second cooling plates 130 and 140. That is, the first and second insulating materials 191 and 192 may include portions 191a and 192a located on the first and second cooling plates 130 and 140 as illustrated in FIG. 3 and portions 191b and 192b exposed outside the first and second cooling plates 130 and 140 as illustrated in FIG. 4. Accordingly, short circuits between the tabs 181 and 182 and the first and second cooling plates 130 and 140 or short circuits between the tabs 181 and 182 and the exterior material 170 may be prevented.

As illustrated in FIG. 3, the cooling plate 160 may further include first and second cathode holes 131a and 141a for electrical connection between the cathodes 111a and 121a and the cathode tab 181. The cooling plate 160 may further include first and second anode holes 131b and 141b for electrical connection between the anodes 111b and 121b and the anode tab 182. More specific description thereabout will be given below.

To expose the cathode tab 181 outside the first cooling plate 130, the first cathode hole 131a is formed through the area of the first cooling plate 130 that overlaps the cathode tab 181. To expose the anode tab 182 outside the first cooling plate 130, the first anode hole 131b is formed through the area of the first cooling plate 130 that overlaps the anode tab 182. To expose the cathode tab 181 outside the second cooling plate 140, the second cathode hole 141a is formed through the area of the second cooling plate 140 that overlaps the cathode tab 181. To expose the anode tab 182 outside the second cooling plate 140, the second anode hole 141b is formed through the area of the second cooling plate 140 that overlaps the anode tab 182.

As illustrated in FIG. 4, the first cathode lead 113a extending from the first cathode 111a may be connected to the cathode tab 181 through the first cathode hole 131a. The first anode lead 113b extending from the first anode 111b may be connected to the anode tab 182 through the first anode hole 131b. The second cathode lead 123a extending from the second cathode 121a may be connected to the cathode tab 181 through the second cathode hole 141a. The second anode lead 123b extending from the second anode 121b may be connected to the anode tab 182 through the second anode hole 141b. Through these connections, the cathodes 111a and 121a and the cathode tab 181 may be electrically connected together, and the anodes 111b and 121b and the anode tab 182 may be electrically connected together. The leads may be connected to the tabs through welding.

As illustrated in FIGS. 3 and 4, the secondary battery of this embodiment may further include third insulating materials 193a and 193b and fourth insulating materials 194a and 194b. The third insulating materials 193a and 193b are insulating materials that are disposed along inside surfaces of the first cooling plate 130 that define the first cathode hole 131a and the first anode hole 131b, respectively. The fourth insulating materials 194a and 194b are insulating materials that are disposed along inside surfaces of the second cooling plate 141 that define the second cathode hole 141a and the second anode hole 141b, respectively. As illustrated in FIG. 3, the third insulating materials 193a and 193b and the fourth insulating materials 194a and 194b may be integrated with the adhesive layer 150.

As illustrated in FIG. 2, the exterior material 170 may include an upper exterior material 171 and a lower exterior material 172. The lower exterior material 172, together with the upper exterior material 171, may form the receiving space S in which the first and second electrode assemblies 110 and 120 are received. The receiving space S may be filled with an electrolyte. As illustrated in FIG. 5, the cooling plate 160 may be formed such that the periphery of the cooling plate 160 is exposed outside the upper and lower exterior materials 171 and 172. The portion of the cooling plate 160 that is exposed outside the exterior material 170 may function as a cooling fin that radiates heat.

As illustrated in FIG. 2, the secondary battery of this embodiment may further include an upper sealing layer 196 (e.g., a flange portion, etc.) that hermetically joins the upper exterior material 171 to an upper surface of the cooling plate 160 and a lower sealing layer 197 that hermetically joins the lower exterior material 172 to a lower surface of the cooling plate 160. For example, with respect to FIG. 2, the upper sealing layer 196 may be formed on a portion of a lower surface of the upper exterior material 171 that makes contact with an upper surface of the first cooling plate 130, and the lower sealing layer 197 may be formed on a portion of an upper surface of the lower exterior material 172 that makes contact with a lower surface of the second cooling plate 140. Accordingly, the inside of the exterior material 170 may be sealed from the outside. The upper and lower sealing layers 196 and 197 may be formed by thermal fusion. Alternatively, the upper and lower sealing layers 196 and 197 may be formed by a combination of thermal fusion and laser welding.

As illustrated in FIG. 1, the cooling plate 160 may further include a sensor insertion opening 190 that is formed in the adhesive layer 150 to allow for insertion of a temperature sensor. The sensor insertion opening 190 may extend from one portion (refer to FIG. 1) of the adhesive layer 150 that is exposed to the outside from between the upper and lower exterior materials 171 and 172 to another portion (refer to FIG. 5) of the adhesive layer 150 where the first and second electrode assemblies 110 and 120 are located. The sensor insertion opening 190 provides a space in which the temperature sensor is installed. Because the sensor insertion opening 190 is formed adjacent to the electrode assemblies 110 and 120, when the temperatures of the electrode assemblies 110 and 120 are measured through the temperature sensor inserted into the sensor insertion opening 190, the accuracy of the measured temperatures may be improved, and a time difference of temperature measurement may be reduced.

As illustrated in FIGS. 1 and 3, the cooling plate 160 and the exterior material 170 may have through-holes 132 and 142 and through-holes 173 and 174 that are formed through the cooling plate 160 and the exterior material 170 in corresponding positions. For example, as illustrated in FIG. 2, the upper and lower exterior materials 171 and 172 may have the through-holes 173 and 174 formed through corners of the upper and lower exterior materials 171 and 172. As illustrated in FIG. 3, the through-holes 132 and 142 may be formed through the first cooling plate 130 and the second cooling plate 140 to correspond to the through-holes 173 and 174. Further, the adhesive layer 150 may have through-holes formed therein. When several secondary batteries are assembled into one module, the through-holes may provide spaces into which coupling rods are inserted to couple the secondary batteries.

Figure 6:
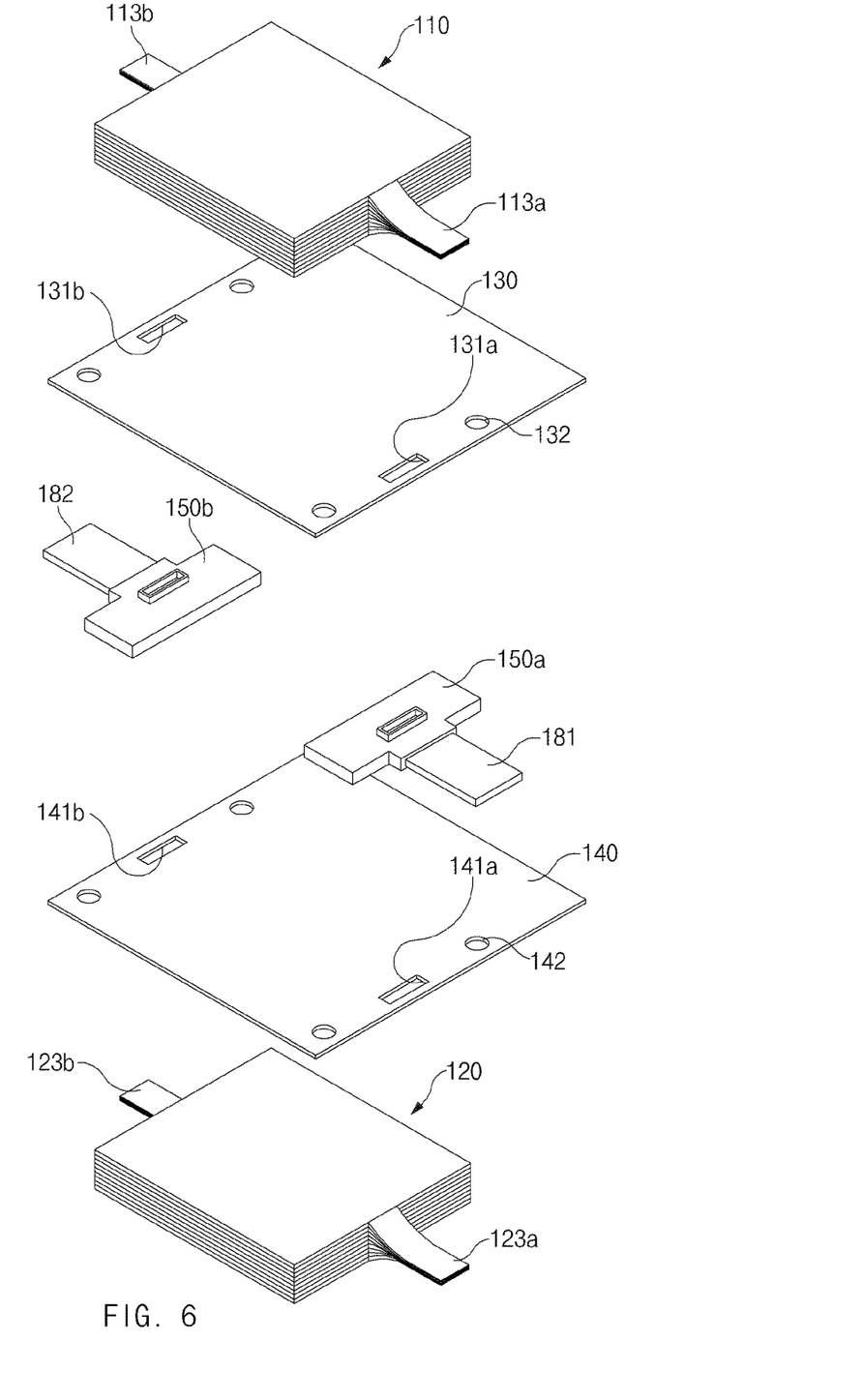
FIG. 6 is an exploded perspective view illustrating a first modified example of the secondary battery of FIG. 1.

The secondary battery of FIG. 1 may be modified as illustrated in FIG. 6. FIG. 6 is an exploded perspective view illustrating a first modified example of the secondary battery of FIG. 1. FIG. 6 corresponds to FIG. 3. As illustrated in FIG. 6, adhesive layers 150a and 150b that bond and insulate tabs 181 and 182 and cooling plates 160 may be formed in only areas required to seal the tabs 181 and 182.

Figure 7:
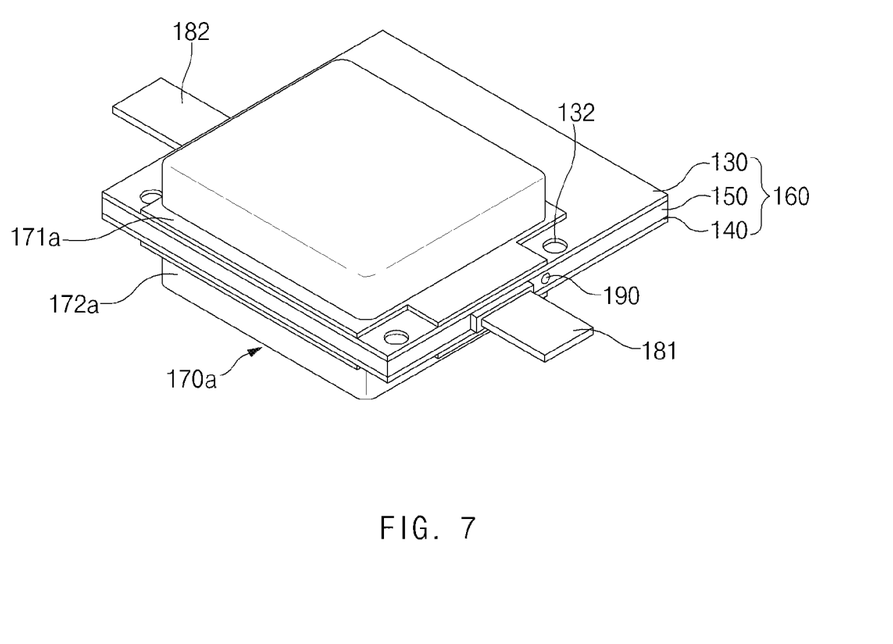
FIG. 7 is a perspective view illustrating a second modified example of the secondary battery of FIG. 1.

The secondary battery of FIG. 1 may be modified as illustrated in FIG. 7. FIG. 7 is a perspective view illustrating a second modified example of the secondary battery of FIG. 1. As illustrated in FIG. 7, upper and lower exterior materials 171a and 172a may be formed in a form in which areas of the upper and lower exterior materials 171a and 172a that correspond to through-holes of first and second cooling plates 130 and 140 are removed.

Figure 8:
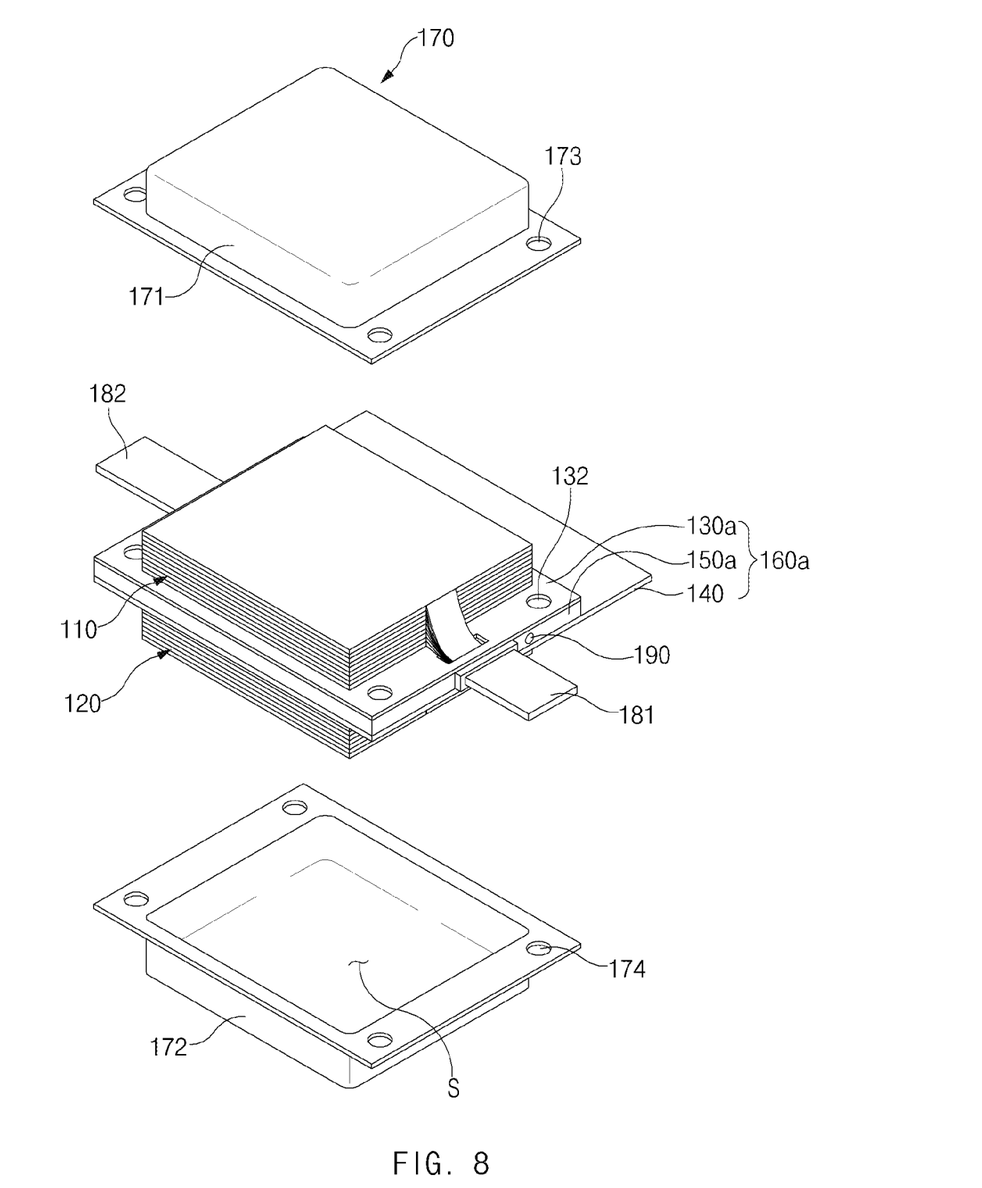
FIG. 8 is a perspective view illustrating a third modified example of the secondary battery of FIG. 1.

The secondary battery of FIG. 1 may be modified as illustrated in FIG. 8. FIG. 8 is a perspective view illustrating a third modified example of the secondary battery of FIG. 1. As illustrated in FIG. 8, one of first and second cooling plates 130a and 140 may be formed to be shorter than the other. For example, as illustrated in FIG. 8, the first cooling plate 130a may be formed to have a size corresponding to electrode assemblies 110 and 120, and the second cooling plate 140 may be formed to be longer than the first cooling plate 130a with respect to any one direction. An adhesive layer 150a may have a size corresponding to a shorter one of the first and second cooling plates 130a and 140.

According to the present disclosure, the cooling plate is disposed between the electrode assemblies and is capable of cooling the electrode assemblies. Accordingly, a separate cooling structure may not be used, or the use thereof may be reduced.

Furthermore, according to the present disclosure, the tabs are coupled to the cooling plate, and thus deformation of the tabs may be minimized even though loads are applied to the tabs. Moreover, due to the cooling plate, the loads applied to the tabs are not directly transmitted to the electrode assembles, and thus deformation of the electrode assemblies may be minimized even though the loads are applied to the tabs.

In addition, according to the present disclosure, the tabs are sealed between the cooling plates. Accordingly, a separate process of forming a seal between the tabs and the exterior material may be omitted, and due to this, the exterior material or a sealing method thereof may be more freely selected.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A secondary battery comprising:
a first electrode assembly including a first cathode and a first anode;
a second electrode assembly disposed to be opposite the first electrode assembly, the second electrode assembly including a second cathode and a second anode;
a cooling plate disposed between the first and second electrode assemblies for cooling of the first and second electrode assemblies;
an exterior material in which the first and second electrode assemblies are disposed;
a cathode tab electrically connected to the first and second cathodes and exposed outside the exterior material; and
an anode tab electrically connected to the first and second anodes and exposed outside the exterior material,
wherein at least one of the cathode tab and the anode tab is coupled to the cooling plate,
wherein the cooling plate includes:
a first cooling plate in contact with a surface of the first electrode assembly, wherein the surface of the first electrode assembly faces the second electrode assembly; and
a second cooling plate disposed to be opposite the first cooling plate and in contact with a surface of the second electrode assembly, wherein the surface of the second electrode assembly faces the first electrode assembly, and
wherein the cathode tab and the anode tab are arranged between the first and second cooling plates.

2. The secondary battery of claim 1, further comprising:
a first insulating material surrounding an area of the cathode tab to insulate the cathode tab from the first and second cooling plates, wherein the area of the cathode tab overlaps the first and second cooling plates in a stacking direction of the first and second electrode assemblies; and
a second insulating material surrounding an area of the anode tab to insulate the anode tab from the first and second cooling plates, wherein the area of the anode tab overlaps the first and second cooling plates in the stacking direction.

3. The secondary battery of claim 2, wherein the first and second insulating materials extend outside the first and second cooling plates to be exposed.

4. The secondary battery of claim 1, wherein the cooling plate further includes:
a first cathode hole formed through a first area of the first cooling plate and configured such that the cathode tab is exposed outside the first cooling plate, wherein the first area of the first cooling plate overlaps the cathode tab in a stacking direction of the first and second electrode assemblies;
a first anode hole formed through a second area of the first cooling plate and configured such that the anode tab is exposed outside the first cooling plate, wherein the second area of the first cooling plate overlaps the anode tab in the stacking direction;
a second cathode hole formed through a first area of the second cooling plate and configured such that the cathode tab is exposed outside the second cooling plate, wherein the first area of the second cooling plate overlaps the cathode tab in the stacking direction; and
a second anode hole formed through a second area of the second cooling plate and configured such that the anode tab is exposed outside the second cooling plate, wherein the second area of the second cooling plate overlaps the anode tab in the stacking direction.

5. The secondary battery of claim 4, wherein the first electrode assembly further includes:
a first cathode lead extending from the first cathode and connected to the cathode tab through the first cathode hole; and
a first anode lead extending from the first anode and connected to the anode tab through the first anode hole, and
wherein the second electrode assembly further includes:
a second cathode lead extending from the second cathode and connected to the cathode tab through the second cathode hole; and
a second anode lead extending from the second anode and connected to the anode tab through the second anode hole.

6. The secondary battery of claim 5, further comprising:
third insulating materials disposed along inside surfaces of the first cooling plate, wherein the inside surfaces of the first cooling plate define the first cathode hole and the first anode hole; and
fourth insulating materials disposed along inside surfaces of the second cooling plate, wherein the inside surfaces of the second cooling plate define the second cathode hole and the second anode hole.

7. The secondary battery of claim 1, wherein the exterior material includes an upper exterior material and a lower exterior material, wherein a receiving space, in which the first and second electrode assemblies are disposed, is defined between the upper and lower exterior materials, and
wherein the cooling plate is configured and arranged such that a periphery of the cooling plate is exposed outside the upper and lower exterior materials.

8. The secondary battery of claim 7, further comprising:
an upper sealing layer configured and arranged such that the upper exterior material is hermetically joined to an upper surface of the cooling plate; and
a lower sealing layer configured and arranged such that the lower exterior material is hermetically joined to a lower surface of the cooling plate.

9. The secondary battery of claim 7, wherein the cooling plate further includes:
an adhesive layer arranged between the first and second cooling plates and configured to bond the first and second cooling plates to each other,
wherein a sensor insertion opening is formed in the adhesive layer to allow for insertion of a temperature sensor, the sensor insertion opening extending from one portion of the adhesive layer, exposed outside the upper and lower exterior materials, to another portion of the adhesive layer where the first and second electrode assemblies are located.

10. The secondary battery of claim 1, wherein the cooling plate and the exterior material have through-holes formed through the cooling plate and the exterior material in corresponding positions.

11. A secondary battery comprising:
a first electrode assembly including a first cathode and a first anode;
a second electrode assembly disposed to be opposite the first electrode assembly, the second electrode assembly including a second cathode and a second anode;
a cooling plate disposed between the first and second electrode assemblies for cooling of the first and second electrode assemblies;
an exterior material in which the first and second electrode assemblies are disposed;
a cathode tab electrically connected to the first and second cathodes and exposed outside the exterior material; and
an anode tab electrically connected to the first and second anodes and exposed outside the exterior material,
wherein at least one of the cathode tab and the anode tab is coupled to the cooling plate, and
wherein the cooling plate includes:
a first cooling plate in contact with a surface of the first electrode assembly, wherein the surface of the first electrode assembly faces the second electrode assembly;
a second cooling plate disposed to be opposite the first cooling plate and in contact with a surface of the second electrode assembly, wherein the surface of the second electrode assembly faces the first electrode assembly; and
an adhesive layer arranged between the first and second cooling plates and configured to bond the first and second cooling plates to each other.

* * * * *